United States Patent [19] [11] 4,377,859
Dunning et al. [45] Mar. 22, 1983

[54] TIME SLOT INTERCHANGER AND CONTROL PROCESSOR APPARATUS FOR USE IN A TELEPHONE SWITCHING NETWORK

[75] Inventors: Stephen C. Dunning, Cary; James T. Gwathmey, Raleigh, both of N.C.

[73] Assignee: International Telephone and Telegraph Corporation, New York, N.Y.

[21] Appl. No.: 183,512

[22] Filed: Sep. 2, 1980

[51] Int. Cl.³ .......................................... H04Q 11/04
[52] U.S. Cl. ...................................... 370/58; 370/68; 179/18 ES
[58] Field of Search .................. 370/66, 68, 58, 59, 370/64; 179/18 ES

[56] References Cited

U.S. PATENT DOCUMENTS

| Re. 29,991 | 5/1979 | Wolcott | 370/64 |
|---|---|---|---|
| 3,649,763 | 3/1972 | Thompson | 370/68 |
| 3,970,794 | 7/1976 | Neufang | 370/58 |
| 4,143,241 | 3/1979 | Aranguren et al. | 370/68 |

FOREIGN PATENT DOCUMENTS

2059719 4/1981 United Kingdom ................. 370/58

Primary Examiner—Douglas W. Olms
Attorney, Agent, or Firm—John T. O'Halloran; Robert E. Lee, Jr.

[57] ABSTRACT

A telephone switching network is disclosed, which network is adapted to provide connections between a plurality of input subscriber lines. The network includes a time slot interchanger which comprises a transmit switch memory and a receive switch memory. The transmit and receive memories are capable of storing data at addressable storage locations, which data is indicative of digital data to be transmitted from a line circuit and digital data to be received by a line circuit during a connection between the two line circuits. A connect memory is also employed for storing data indicative of connections to be made between line circuits. The connect memory as well as the switch memories are controlled in operation by a processor, which processor includes an access control means. The processor and the access control means are operative to cause the connect memory to couple corresponding storage locations of the transmit and receive memories indicative of one subscriber line to corresponding storage locations indicative of another subscriber line. In this manner, any line associated with the system can communicate with any other line. A trunk interface is provided to enable each subscriber associated with a first switching network as above described to communicate with other subscribers associated with an identical switching network via a communications link or trunk. Also disclosed is a unique data format to enable the use of an asynchronous trunk for communication between two or more switching systems of the above described configuration. The data format enables easy detection and recognition of null characters, control characters and data characters by utilizing a unique eight digit format for each of the above described characters.

24 Claims, 5 Drawing Figures

| | | |
|---|---|---|
| SWITCH MEMORY PHASE |  | FIG. 3A |
| SWITCH MEMORY ADDRESS |  | FIG. 3B |
| DATA OUT RECEIVE |  | FIG. 3C |
| DATA IN RECEIVE |  | FIG. 3D |
| RECEIVE WRITE |  | FIG. 3E |
| DATA OUT TRANSMIT |  | FIG. 3F |
| DATA IN TRANSMIT |  | FIG. 3G |
| TRANSMIT WRITE |  | FIG. 3H |
| CONNECT MEMORY ADDRESS |  | FIG. 3I |
| CONNECT DATA OUT |  | FIG. 3J |

TIME SLOT INTERCHANGER AND CONTROL PROCESSOR APPARATUS FOR USE IN A TELEPHONE SWITCHING NETWORK

BACKGROUND OF THE INVENTION

This invention relates to digital switching networks in general and more particularly to a unique arrangement of such a network including a time slot interchanger and a controlling processor which enables an optimum and efficient use of common circuits included in the switching network system.

Essentially, the telephone switching system can be considered as a data switching system as the ability to make connections between various subscribers is inherent in various types of communication systems presently being employed. A conventional type of such a system is, of course, the telephone switching system. Telephone switching is the means by which a communication channel capable of carrying analog or digital information between any two subscribers is established and maintained. Such telephone switching systems are relatively complicated in that overall operation consists of many intricate details. Based on the fact that such switching systems are intricate, their operation cannot be appreciated without the ability to evaluate and understand operation and details in the system.

A paramount concern with the design of any switching system is, of course, concerned with the economics of the system and the overall desire to reduce system complexity, while maintaining a resonable cost for each subscriber line. In this manner, the system can be expanded economically. In actual practice, it is also desirable to reduce the amount of hardware used in system control or, in turn, to attempt to use the same hardware to perform multiple functions without sacrificing the overall operation of the system to enable servicing of all subscribers.

Modern day switching systems employ digital techniques and essentially are referred to as electronic automatic switching systems. In such switching systems, a stored program digital computer is employed for controlling essentially, all switching system functions. An example of an early type of system is the Bell System No. 1 ESS. There are, of course, many other systems by other companies, such as the Assignee herein, which employ digital techniques employing central processors to control the system functions. In such systems, the speed of handling calls is greatly increased over electromechanical systems, while a stored program central control allows great flexibility in accommodating system changes and offerring additional services.

Many of the prior art systems are referred to as space division systems. The term space division implies that communications through the system are made on a relatively random basis according to the requests of a subscriber. Other systems employ a time division technique, which essentially will only allow a subscriber to be connected or to be serviced during a time slot reserved for that subscriber. Both techniques possess certain advantages and disadvantages.

In any event, digital systems utilize multiplex transmission in order to increase efficiency. In such systems, several types of modulation techniques may be employed. The most popular and widely used technique is pulse code modulation or PCM. These techniques essentially enable use of the communication channel such that the information to be conveyed over the channel is a pulse or train of pulses, which may be modulated in amplitude width or position by the message information. The use of PCM in digital switching networks is well known and techniques for providing such signals are also well known. For example, see a text entitled "Transmission Systems for Communications" by Bell Telephone Laboratories, Inc., 3rd Edition (1964).

In modern day practice, a useful digital switching network will also contain at least one stage of time slot switching using a time slot interchanger (TSI). The time slot interchanger enables information appearing in an input time slot to be delayed and then inserted in a different output time slot. This enables the efficient and rapid transfer of information to various points in the switching system. Basically, the TSI consists of a memory and control circuits, which provide access to and from the memory. These control circuits include a connection list memory, which contains a list of input to output connections.

In the basic switching system, subscriber telephone lines are connected to a concentration/expansion stage which is followed by a network switching stage. Essentially, the concentration/expansion stage constitutes the basic switching network. For example, this basic technique is shown in many references including a text entitled "Switching System" by the American Telephone and Telegraph Co. (1961), Chapter 2 entitled "Basic Switching Concepts". In any event, as will be explained, it is possible to combine these functions into a single TSI stage and hence, one can now employ a TSI with fewer outputs than inputs.

As is known in a telephone switching system, each subscriber line must be continuously scanned so that subscribers requesting service can be recognized and a connection be set up through the system. As above indicated, in digital switching systems, scanning is accomplished by means of a system scanner which will recognize a service request and inform the central processor or central control of such a request. The central processor will then connect a subscriber to a dialing register and eventually connect the subscriber line or the calling to the called line. Essentially, the processor must receive the subscriber line scan results and be able to initiate action at the called line by setting up ringing and so on.

In the present switching systems, the scanning functions and control functions are not and have never been part of the TSI function. The difficulty with these systems is evidenced by the complexity required and the necessity to distribute the input/output circuits of the central processor to a large number of telephone lines.

As will be explained, this invention relates to a new organization of a time slot interchanger and an associated controlling processor that enables common circuitry to be used, both for the time switching function and for the scanning and control functions. Essentially, the organization requires that the TSI memory be incorporated as part of the processor memory. In this manner, the time switching function is implemented with the direct memory access circuits (DMA). Scanning information samples are presented to the TSI together with information samples and are stored in the TSI memory which is part and parcel of the processor memory. In the system to be described, the processor can therefore scan all subscriber lines using a simple memory search. In a similar manner, the control signals are available from the TSI with each information sample and both are read from the TSI memory. Accordingly, the processor is adapted to send control signals directly to the subscriber line by writing the correct information into the TSI memory.

In the system to be described, the same timing and control circuits used to collect and distribute information samples (as voice samples in a PCM switch), are also used to collect and distribute scanning and control information. Scanning and control information is sometimes referred to as signalling functions to distinguish the same from supervisory functions and line control functions.

As will be explained, in order to employ the TSI as above described, one requires the use of a larger memory word which is now adapted to accommodate the signalling bits. Essentially, the organization of this system is extremely powerful, as it enables the processor to read and write information bits as well as signalling bits. In the system to be described, this capability of the processor is employed to create communication paths between different processors, to digital generator tone signals, and to allow the processor to perform digital signal processing on information samples.

While it is understood that an effective interface is required between the processor and the TSI, it is no more complex than the ordinary interface which presently exists in conventional processors. For example, any processor as presently employed must have the capability of interfacing with the system memory. In this system, based on the organization of the TSI and processor memory as well as the structural organization of the system, one achieves widespread flexibility in regard to the type of central processor used and the system is capable of utilizing the input/output structure of most general processors and hence, is not tied to one particular structure.

It will also be shown that in this system, as in a conventional digital telephone network which includes digital transmission and digital switching, it is necessary to control the access to, and assignment of the time slots employed on PCM carrier structures used for trunking between network switching points. To accomplish this control, it is necessary to have communications between the control units or processors which are located at each switching point. In such an arrangement, it is often desirable to include the control communications within the PCM carrier data format for reasons of economy and convenience. A problem results in including the control communications in the PCM data format based on the fact that the PCM carrier is a fully synchronous digital transmission circuit, which circuit is normally designed primarily for voice communication. In any event, the control communications occur between asynchronous control units. In prior art digital switching systems, designers employed a bit sealing technique. In such techniques, one employed either a framing bit or a signalling bit to permit the assembly and disassembly of messages between the asynchronous control circuits. Accordingly, buffer memory systems, direct memory access systems and interrupt systems have been used in the prior art to account for the asynchronous interface. Such solutions result in significant problems in that the complexity of the interface units between the control unit and the communications control channel require an inordinate amount of hardware, which makes such systems unreliable in operation and extremely difficult to service. Furthermore, the data rate is extremely low and message transmission is only accommodated in relatively long transmission times.

As will be explained, the system described herein further includes a technique for employing a synchronous PCM time slot as an asynchronous control communications channel. The technique allows both slow speed and high speed burst communications between two asynchronous processors by using a simple data format which enables the automatic detection of null characters, control characters and data characters.

As will be explained, by employing the synchronous PCM time slot together with the unique TSI organization, one achieves a control communications path of an extremely simple structure which requires no additional circuit elements.

BRIEF DESCRIPTION OF THE PREFERRED EMBODIMENT

A switching network of the type adapted to provide connections between a plurality of input subscriber terminals, comprising time slot interchanger means, including a first transmit switch memory (41) having a first plurality of storage locations each associated with a given subscriber terminal for storing at said location data to be transmitted by said line, a second receive switch memory (42) having a second plurality of storage locations each associated with a specific address indicative of a given subscriber terminal for storing at said location data to be received by said line, a connect memory (43) having a plurality of storage locations therein for storing data indicative of connections to be made between subscriber terminals, with each of said locations capable of being accessed by a given address for said location, subscriber terminal interface means (40) having input terminals coupled to said plurality of subscribers and output terminals coupled to said first and second memories (41 and 42) with certain of said output terminals as coupled to said first memory providing transmitted data and other terminals coupled to said second memory for receiving data, processing means coupled to said subscriber terminal interface means, said first and second memories and said connect memory adapted to direct all transmitted data emanating from said certain output terminals of said interface means to said first memory locations, and all received data emanating from said other terminals to said second storage locations, said processing means including access control means for controlling said connect memory to couple any of said first and second storage locations associated with any one subscriber terminal to any other of said first and second storage locations associated with another subscriber terminal via said interface means and according to an address stored in said connect memory, whereby any two subscriber terminals are capable of communicating with each other.

DETAILED DESCRIPTION OF THE INVENTION

Figure 1:
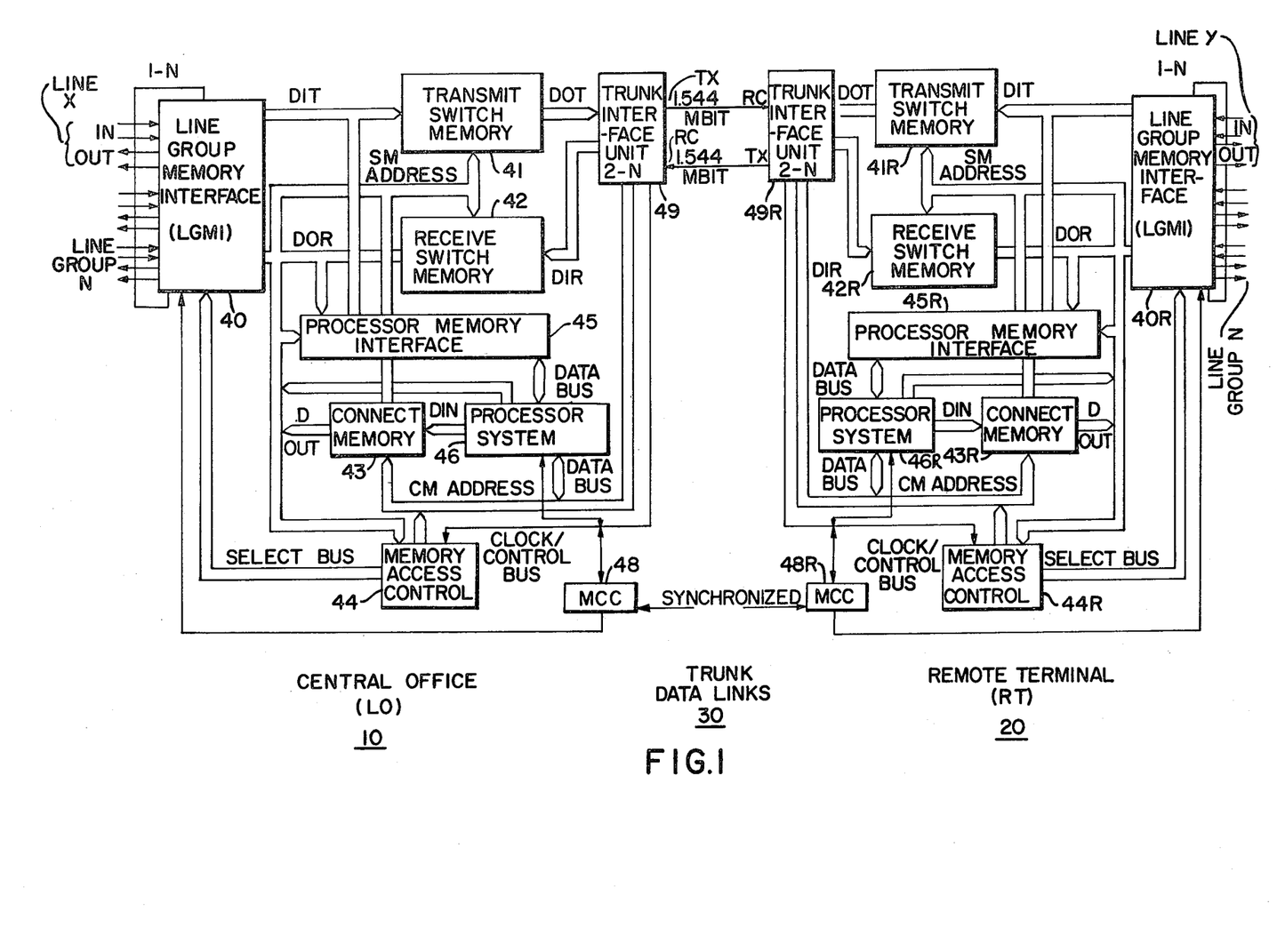
FIG. 1 is a detailed block diagram of a data link transmission path employing two communicating time slot interchangers according to this invention.

FIG. 1 depicts a data link transmission path which is set up between two digital subscriber transmission systems organized according to the principles of this invention.

Essentially, the left side of the FIG. depicts a first central office (CO) 10 which is connected to a remote terminal (RT) 20 via a digital trunk or communications path 30. The remote terminal 20 may be another central office located at an area remote from the central office 10.

It is noted at the onset that the structure depicted in the central office 10 is exactly repeated in the remote terminal 20 and hence, at both sites, the system is essentially the same and each system possesses corresponding identical parts. In this manner, the structure format of the central office 10 will be described and referred to as the digital subscriber transmission system (DST) or a DST switching network.

The DST switching network 10 consists of a single time slot interchanger (TSI), which concentrates 576 lines on 144 time slots. The term concentrator is understood in the prior art and has a particular meaning in the switching art and basically is a device which takes a greater number of inputs and concentrates all inputs to a lesser number of outputs.

The DST switching network is a non-blocking network and path connections are maintained in a connect memory list, which is administered by a microprocessor system for call path setup and takedown. While a microprocessor is employed, as will be further explained, it is noted that the organization of the system as well as its control, can be accommodated by exact structure such as separate memories and registers as well as the fact that the control of all modules must be implemented and directed according to the timing requirements and the sequences which serve to control the structural arrangement to implement the proper system operation.

Essentially, the network is organized with parallel voice sample and signalling sampled paths for each of the 576 input lines. Switching takes place at a constant 8000 sample per second rate.

Referring to FIG. 1, a plurality of line groups are coupled to a line group memory interface circuit (LGMI) 40. The function of the circuit 40 is to receive input and output lines for each subscriber in a group. The interface 40 serves to convert information on a subscriber line to information compatible with the system data or system information, as will be further explained. For present purposes, the line group memory interface 40 receives two wires designated as IN from each subscriber line and two wires designated as OUT for each subscriber line. Since the system is a digital system, it performs four wire switching and each line circuit associated with each subscriber to the system has a two wire receive line (OUT) and a two wire transmit line (IN).

Before proceeding further, it is noted that the switching network arrangement encompassing the central office 10 is arranged in a digital computer-like orientation.

It is noted at the onset that the system to be described can be implemented by the use of a microprocessor of many types which are commercially available. For example, a typical unit which can be employed to implement many of the functions depicted in FIG. 1 is designated as the Z-80A manufactured by Zilog, Inc. Essentially, this microprocessor is a single chip N-channel LSI device. The unit is capable of implementing over one hundred fifty instructions and can execute programs stored in read only memories (ROM), which instructions include 4, 8 and 16 bit operations.

This particular microprocessor family contains a central processing unit (CPU), a programmable parallel input/output control (PIO), a programmable serial input/output control (SIO), a counter timer circuit (CTC) and a high speed direct memory access controller (DMA). The unit contains separate index registers, fast interrupt response and also has the ability to generate control signals for standard memory circuits. The DMA circuit is provided for applications in which data must be transferred directly into the memory at a very high rate, rather than going through the central processor unit.

The present invention employs a memory access control (MAC) 44 which works in conjunction with the above microprocessor. It is, of course, understood that upon viewing of FIG. 1 and in conjunction with the explanation of operation, that many other microprocessors can be employed to implement the operation to be described. It is further understood that separate memories and hence, separate structure could also be employed to implement the various memory modules and registers to be described.

Referring to FIG. 1, there is shown a transmit switch memory 41, a receive switch memory 42 and a connect memory 43. If a microprocessor is employed, the switch memories 41 and 42 can be mapped into the address space of the microprocessor and hence, will be mapped into the same memory structure as containing the connect memory 43. In this manner, all voice and signalling samples which emanate from the line group memory interface circuit 40 are available to the processor.

As seen from FIG. 1, the transmit switch memory 41 receives an input from the line group memory interface 40 designated as DIT or data input transmit. It is noted that the particular representation for the DIT input constitutes and denotes a multiple lead or cable input necessary to provide the transmit switch memory with a plurality of leads necessary to accommodate the data emanating from each line coupled to the input of the LGMI 40. In a similar manner, the receive switch memory 42 has an output labelled DOR or data output receive coupled by means of a cable to the LGMI 40. Both the transmit switch memory 41 and the receive switch memory 42 are coupled to the memory access control module 44, which also has an output coupled to the LMGI circuit 40.

The processing or control of the connect memory 43 and the transmit and receive memories 41 and 42 is implemented, as will be explained, by the processor memory interface module 45 as well as the module 46 generally designated as the processor system. Essentially the processor system includes a CPU if a microprocessor is employed, or is an arrangement of suitable registers and hardware capable of implementing program instructions.

The memory access control 44 also interfaces with the processor memory interface 45. In a similar manner, the processor system 46 has a data bus coupled to the processor memory interface 45. The data bus enables the bi-directional transmission of data between the modules 45 and 46. The processor system 46 also is coupled to the switch memory (SM) address bus emanating from memory access control, as will be explained. The processor system 46 further controls the connect memory 43, which also interfaces via the D-OUT line to the SM address bus.

The sequence and timing for the line group memory interface 40, the memory access control 44, the processor system 46 as well as various other modules is derived from the master clock and control unit (MCC) 48. The network interfaces with the outside world via a trunk interface unit 49 (TIU). The trunk interface unit 49 receives outputs from the transmit switch memory 41 (DOT) and sends inputs or input data (DIR) to the receive switch memory 42. Timing for the trunk interface unit 49 is again supplied by the MCC 48. The trunk interface unit 49 is also coupled via a connect memory (CM) address bus to the connectmemory 43. Data on the CM address bus can further be controlled and implemented by the memory access control 44 as well as the processor system 46.

Essentially, the memory access control 44 is employed to control and direct access to memories 41, 42 and 43 and hence, can transfer samples into and out of these memories forming a time slot interchange action. All operations involving the memories are under control of the memory access control unit (MAC) 44. The DMA data is made available to and from the switch memory and the various interface units, as above described, on the separate parallel data buses which serve to minimize circuit delay and maximize switching capacity, which buses are associated with the processor.

The overall system timing is based on a twenty-four channel PCM system. Hence, all input lines and output trunks are in the 24 channel, 1.544 M bit format. This format is well known and is described in the Bell Telephone Text on pages 629 to 657.

As above indicated, all of the required clocks and control signals are provided by the MCC 48, which is capable of synchronizing to a network master clock, which clock may be a stable crystal oscillator and hence, all signals emanating from the MCC 48 are extremely stable in time and duration.

The transmit switch memory 41 is a high speed random access read write memory as is the receive switch memory 42. Such memories can be purchased as separate components or portions of a microprocessor memory can be mapped and hence, reserved for the transmit switch memory 41 as well as the receive switch memory 42.

The transmit switch memory is organized as 1024 by 14 bit memory and the receive switch memory 42 is organized as 1024×11. The transmit switch memory 41 has an 8 bit voice data field and a 6 bit control field used for supervisory signalling and service type/grade identification. The receive switch memory 42 has an 8 bit voice data field and a 3 bit control field, which can be used for supervisory signalling and test mode enable. A test mode enable operation is easily implemented in a switching system and techniques for doing so are not included herein.

Essentially, the memories 41 and 42, if mapped into a microprocessor memory space, are broken into 1024 word pages as shown in the Table below referenced as Processor Memory Address Map.

| PROCESSOR MEMORY ADDRESS MAP | |
|---|---|
| USE | HEX ADDRESS RANGE |
| PROGRAM ROM | 000 to 3FFF |
| UNASSIGNED | 4000 to 7FFF |
| DATA RAM | 8000 to 8FFF |
| UNASSIGNED | 9000 to DFFF |
| TX0–TX7 (SM) | E000 to E3FF |
| TX8, BUSY (SM) | E400 to E7FF |
| TX9–TX13 (SM) | E800 to EBFF |
| RC0–RC7 (SM) | EC00 to EFFF |
| RC8–RC10 (SM) | F000 to F3FF |
| CONNECT MEMORY | F400 to F7FF |
| UNASSIGNED | F800 to FFFF |

In the above noted table, the terms TX represent a particular bit in the 14 bit switch memory word of 41. Hence, TX0–TX7 would represent SM bits 0 to 7. The term RC represents a bit in the 11 bit switch memory word of 42. The remainder of the terms including the hex address range are conventional terminology and should be understood by those skilled in the art.

Figure 2:
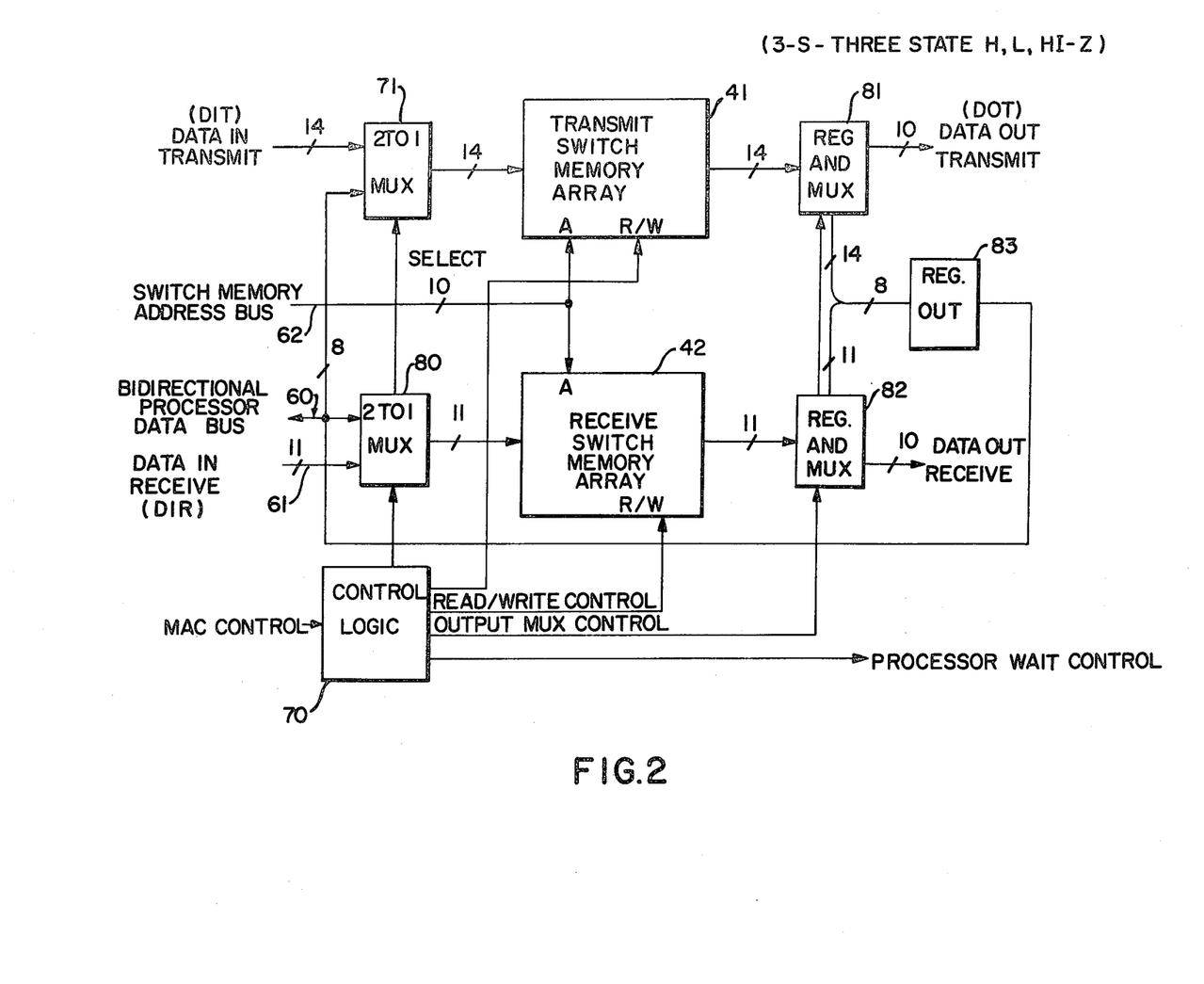
FIG. 2 is a block diagram of a switch memory configuration used in this invention.

Referring to FIG. 2, there is shown a block diagram of the switch memory and associated processor interface. Essentially, the switch memory consists of the transmit switch array 41 and the receive array 42.

FIG. 2 employs a dual port input/output architecture with one port 60 always reserved for the processor interface and the second port 61 for the DMA data.

In FIG. 2, cables are also indicated by a slashed line with a number, which number designates the number of data lines provided between the various units.

A common address bus 62 is presented to the transmit and receive switch memories 41 and 42. In this manner, it is possible to write into the transmit side of the memory 41 at a given address, for example, mmm and at the same time, read out of the receive side of the memory 42 at the same address. However, simultaneous DMA operations at different addresses are not possible and hence, all processor accesses are single operations.

As can be seen, the switch memory shown in FIG. 2 has control logic 70 which is under control of the MAC module 44. The control logic 70 enables read write control of both the transmit and receive memories 41 and 42.

As can be seen from FIG. 2, the data input to the transmit memory DIT emanates from the line group memory interface 40 and is directed to a multiplexer 71, which multiplexer 71 also receives data from the bi-directional processor data bus. The receive memory receives input data from the trunk interface unit 49 via lead 61 which is also coupled to a multiplexer 80 (2 to 1 mux). The control logic module 70 controls operation of the multiplexers 71 and 80 as well as the output multiplexers and registers 81 and 82.

The output from the transmit switch memory 41 is applied to a register and multiplexer 81 which receives the data stored in the memory and transmits the same to the trunk interface unit as DOT data. In a similar manner, the output from the receive memory 42 is stored in register and multiplexer 82 where it is transmitted to the line group memory interface circuit 40. The control logic 70 also provides a processor wait control signal, which signal will stop the processor from further processing until the data transmission from either memory 41 or 42 is completed.

A register 83 is used to monitor the data stored in registers 81 and 82 in order to transmit this data back to the processor system.

Essentially, as will be explained, the memory basically consists of the transmit switch memory 41 and the receive switch memory 42. Each is controlled by the memory access control 44.

Again referring to FIG. 1, the LGMI 40 receives at its input a plurality of subscriber lines, as for example, 576 input lines in serial by bit format consisting of 24 subscriber lines for each one of N line groups and the LGMI performs serial to parallel conversion. Techniques for performing conversion of multiplexed data channels are well known in the art and such techniques may employ shift registers. In a like manner data is sent to the subscriber lines from the LGMI LC in serial by bit format 24 subscribers to a group.

In any event, the techniques of switching operation requires that a sample from each input line (transmit or receive line) be written into and read from the switch memories at the 8000 sample per second rate on a normal two-way connection. The input line is accessed at the LGMI 40. The output of the switch is via the Trunk interface Unit 49. The connect memory 43 has stored therein a connect table which controls the scanning of both the input and output lines according to the data stored in connect memory 43. Samples for the 144 connected input to output pairs are read from and written into the switch memories 41 and 42 at the 8000 sample per second rate according to the list stored in the connect memory 43. Thus a minimum of 576 dual operations plus 144 times 2 or 864 memory cycles are required every 125 microseconds (1/8000 samples per second). In addition, switch memory access for both read and transmit memories must be available to the processor as required in order to allow system connections and signalling to be implemented.

In order to implement the above described operation, reference is made to FIG. 3 depicting waveforms indicative of the switch memory timing operation. The switch memory is designed to operate with a basic period of 100 n seconds defined as a phase as seen in FIG. 3A. A complete memory cycle consists of two phases: Phase A and Phase B for a total of 200 n seconds. Phase A indicates a dual operation memory access which is associated with the input side of the switch. Hence, during phase A, each input line as connected to the LGMI 40 is accessed. Phase B is a free access phase available to any switch memory user and in order to implement any valid operation. For example, phase B times are used to connect outputs as trunks, tone generators and to provide processor access.

Figure 3A:
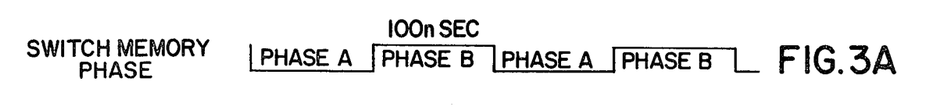
FIG. 3 is a series of waveforms depicting switch memory timing.
Figure 3B:
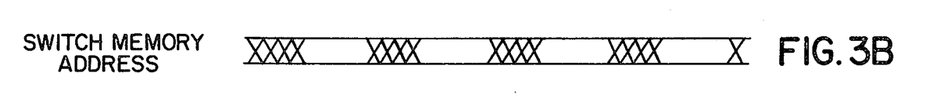

Referring to FIG. 3B, there is shown the timing in relation to phase A and phase B of the switch memory address signal (SM) address. The period between X's indicates valid signals are available. As one can see, the SM address can be accessed during phase A or phase B.

Figure 3C:
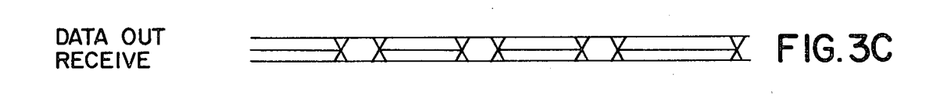
Figure 3D:
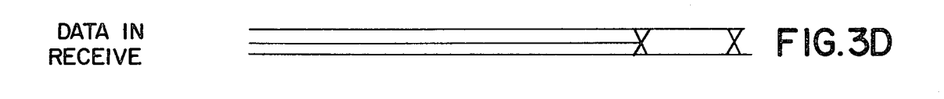

FIG. 3C depicts the timing for the data output received or the data emanating from the receive switch memory 42. As one can see, this data can also be received during any clock phase, as can the data in receive (FIG. 3D) which is the data input to the switch memory 42 from the trunk interface unit 49.

Figure 3E:
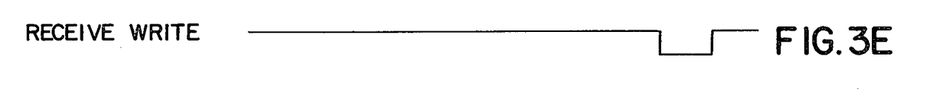

FIG. 3E depicts the receive write command. The receive write command occurs during the interval shown in phase B wherein the data IN to memory 42 from the trunk interface unit 49 is written into the memory at the address specified by the SM memory address leads.

Figure 3F:
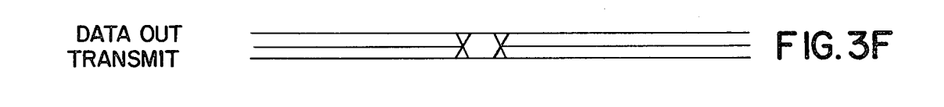
Figure 3G:
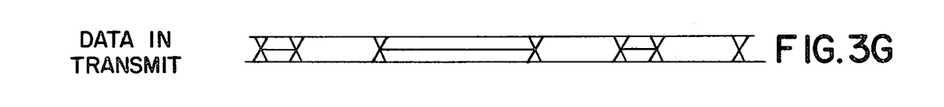

FIG. 3F depicts the transmission of output data (DOT) from the transmit switch memory 41, while FIG. 3G depicts the transmission of input data (DIT) to the transmit switch memory 41.

Figure 3H:
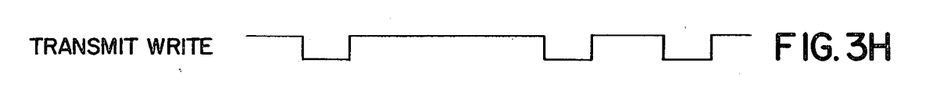

As can be seen from FIG. 3H, data is written into the transmit switch memory 41 during the last portion of a phase A or B.

Figure 3I:
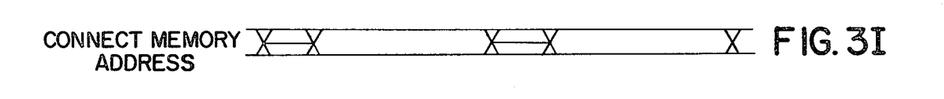

Referring to FIG. 3I, the interval reserved for the connect memory address occurs during phase B and hence, during phase A, the LGMI is controlled according to MAC 44 to enable access to each input line.

Figure 3J:
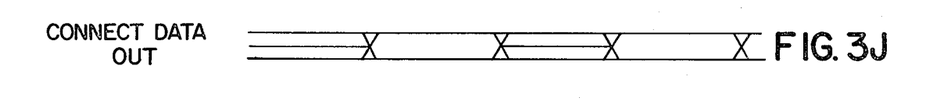

FIG. 3J depicts the connect data output timing which enables the data emanating from the memory 43 to control the direct storage of pertinent data to the switch memory modules 41 and 42.

Figure 4:
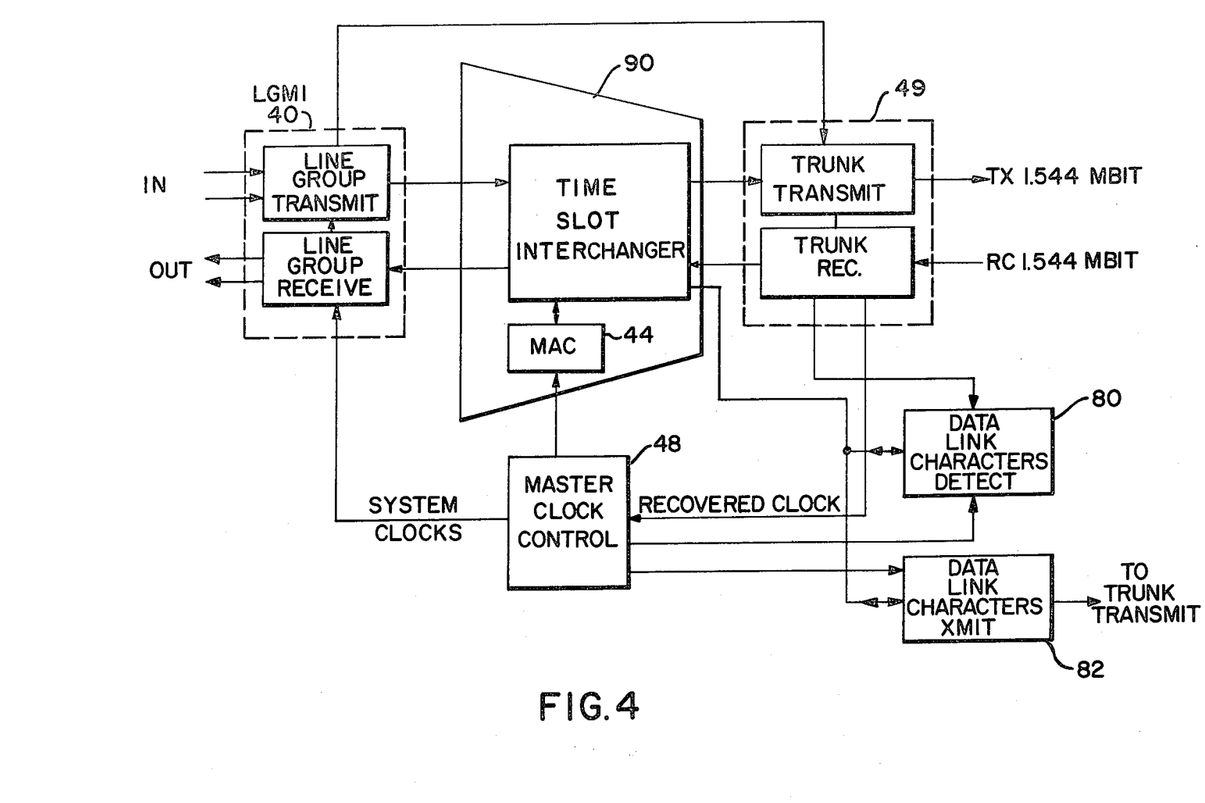
FIG. 4 is a simple block diagram of a single switching network employing a time slot interchanger.

Referring to FIG. 4, there is shown a simplified block diagram of the digital switch defining the time slot interchanger module 90. Essentially, the time slot interchanger 90 consists of and includes the transmit switch memory 41, the receive switch memory 42, the connect memory 43 and the processor system and interface.

The memory access control 44 is shown as a separate entity in that it provides synchronization and control of all switching functions.

The LGMI 40 of FIG. 1, basically as described, consists of the transmit lines in a group and the receive lines in another group. This is a convenient way of handling the plurality of line circuits found in the switching system.

The trunk interface unit 49 is again arranged as a trunk transmit group and a trunk receive group. Again, the trunk interface unit 49 is a multiplexer similar to the configuration of the LGMI 40 and, for example, can transmit the data emanating from memory 41 to one of n trunks and receive the data and direct it to the switch memory 42 from the n trunks connected thereto.

As indicated, the trunk interface unit 49 is controlled in timing by the master clock 48, which in time controls the MAC 44 and hence, defines all system clocks as shown in FIGS. 1 and 4. The master clock control 48 can be synchronized to a crystal oscillator or one can externally synchronize the MCC 48 from any remote terminal as 20, which is connected to the system.

Hence, when any two digital switching units are connected together as CO 10 and RT 20 of FIG. 1, the only timing requirement to be met is for the rate of data transfer at the boundary between the systems to be equal. In a twenty-four channel PCM environment, this requirement is met by providing a common frequency clock to all units in the network such that the long term average frequency for all nodes is the same. Phase and jitter perturbations can be accommodated by elastic storage techniques or other clocking and synchronization schemes which are known in the art.

In this system, as one can ascertain from FIG. 4, the recovered clock from the receive section of the TIU 49 can be used to synchronize the master clock 48 of any system coupled thereto. The master clock control 48, when synchronized to an external system, generates a 1.544 MHz clock and system framing using the recovered clock from any one of the trunk line spans which are coupled to the TIU 49. There is no fixed relationship between the framing information of the incoming span line and system framing.

The line groups are connected to their respective interface units as the LGMI via a serial 24 channel PCM signal using a standard frame bit pattern. In this manner, master framing information is distributed to each of the line groups coupled to the LGMI by the MCC 48 so that all incoming data from the line groups can be synchronized. In a similar manner, all data transmitted to the line groups and to the trunks is synchronized by the MCC frame signals. This system synchronization technique greatly simplifies the task of passing data to and from the TSI 90 by proper order of the information. Hence, the TSI 90 may employ an asynchronous clock, as will be explained, that does not require any synchronization with the system frame signals. In general, this technique allows for asynchronous communications using a synchronous communication channel. By using a simple data format, one can detect null characters, control characters and data characters, as will be explained, and hence, the TSI clock does not require synchronization of the system frame signals and therefore, the master clock 48 will control the synchronization of the LGMI 40 and the TIU 49.

Referring to FIG. 5, there is shown a memory access sequence timing format. As indicated, the MAC 44 controls all operations of the switch memories 41 and 42 incorporated in the time slot interchanger 90. This control is afforded by generating memory access sequences at the proper time. The MAC 44 uses the system frame pulse and the master clock 48 to execute a series of memory access sequences. Each sequence is started by a signal called channel strobe depicted in FIG. 5B which designates eight clock cycles representing an 8 bit PCM sample.

Figure 5A:
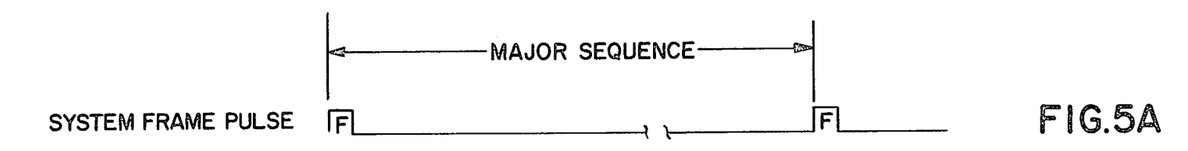
FIG. 5 is a series of timing diagrams depicting a typical memory access sequence useful in explaining operation of this system.
Figure 5B:
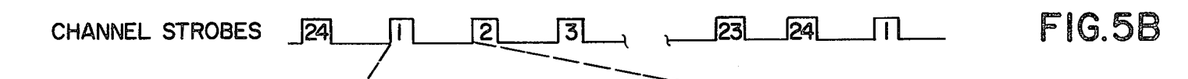
Figure 5C:
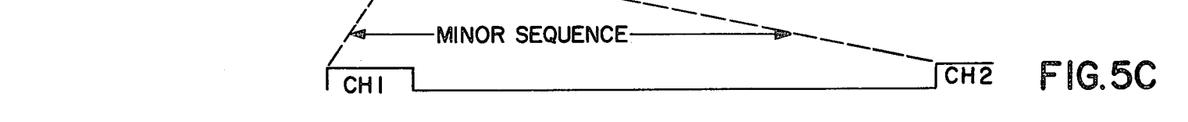

Referring to FIG. 5A, a major sequence is defined as the time separation between a system frame pulse F. In a twenty-four channel system, there are twenty-four channel strobes developed for each major sequence. Hence, a major sequence is made up of twenty-four minor sequences (FIG. 5B) that allow data transfer to and from the 576 input lines and 144 output time slots and provides processor access opportunity at the rate of one major sequence every 125 microseconds. In every minor sequence, as shown in FIG. 5C, which is defined as the time separation between a channel strobe, data is transferred to and from the line inputs in the sequence 1,25,49,73,97 and so on, where the numbers represent both a switch memory address and a line identification number.

Figure 5D:
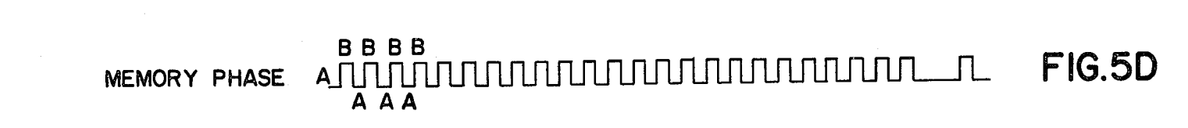
Figure 5E:
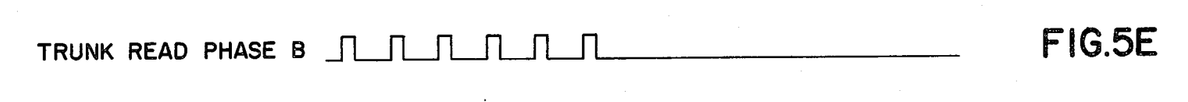

As can be seen from FIG. 1, the LGMI 40 interfaces with the transmit switch memory 41 on the data input lead DIT. The receive memory interfaces with the LGMI 40 on the data out receive DOR. The MAC 44 is coupled to the LGMI via the select bus cable and is coupled to the memories 41 and 42 via the switch memory address signal. In this manner, during a minor sequence occurring during phase A of the memory, as shown in FIG. 5D, which is equivalent to FIG. 3A, data is transferred to and from the line inputs and the number represents a switch memory address and a line identification number.

During every other phase B, as shown for example in FIG. 3F, data is transferred to or from a trunk. Hence, data to a trunk output is in the sequence: trunk 1—time slot 1; trunk 2—time slot 1. This is clearly depicted in FIG. 5E. The data transferred to the trunk emanates from the location in the switch memory accessed by the contents of the connect memory location corresponding to the trunk time slot number which is supplied by the MAC.

As can be seen from FIG. 1, the transmit switch memory 41 is coupled to the TIU 49 via the data out transmit cable DOT. The TIU 49 is coupled to the receive switch memory 42 via the data in receive cable DIR. The MAC 44 is coupled to the connect memory 43 and the TIU 49 via the connect memory address bus. The connect memory 43, as above indicated, is coupled to the switch memory address directed to the transmit switch memory 41 and the receive memory 42. Control strobes or timing are directed from the TIU 49 to the MAC 44 as shown in FIG. 1. Hence, data from the trunks is in the sequence: trunk 1—time slot X1; trunk 2—time slot X2, and so on, where each TIU 49 supplies the time slot number X. Hence, by having each TIU tag its data, the requirement for input trunk and system frame synchronization is eliminated.

Figure 5F:
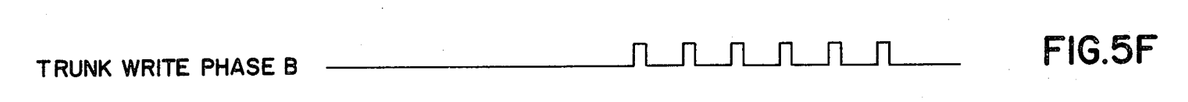
Figure 5G:
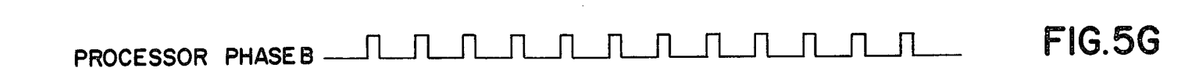

A typical trunk write phase during the B phase of the memory cycle is shown in FIG. 5F, while the processor phase which always occurs during every other B cycle is shown in FIG. 5G. In this manner, the other twelve phase B times are available to the processor (FIG. 5G) for access to any part of the switch memory. A larger number of opportunities are available than needed to insure rapid processor access to the switch memory. These phase B times are also used by the processor to access the connect memory 43 since the memory 43 is used during the trunk phase B times. Again referring to FIG. 1, line inputs of the LGMI 40 are organized as groups of twenty-four channels in a PCM format. As indicated above, these groups are synchronized with system frame pulses in both the receive and transmit directions. The PCM format is conventional, but only voice samples are transmitted in frames 6 or 12 and no signalling is inserted in these frames. An additional link with an identical format is used to transfer signalling information between the line groups and the LGMI 40 of the digital switch.

The LGMI 40 converts the serial voice data and the serial signalling data from the line groups into a parallel sample for input to the switch memory 41. The serial to parallel conversion of such data is extremely well known in the art. This conversion occurs during a memory sequence and the LGMI 40 concurrently converts the parallel output samples which are read from the switch memory 42 into serial voice and signalling for the line groups. The technique of converting parallel to serial data is also well known and many such prior art techniques can be employed to implement each and every function of the LGMI 40.

In the trunk interface unit 49, trunk outputs on the concentrated side of the switch are organized as twenty-four channel PCM including two signalling bits inserted in frame 6 and frame 12. The MAC 44 outputs an 8 bit voice sample and two signalling bits to each TIU 49 during a minor memory sequence (FIG. 5C) and the TIU 49 converts the parallel word into serial format. The MAC 44 also inputs an 8 bit voice sample, two signalling bits and a channel number for each TIU 49 into the receive switch memory 42.

As above indicated, the TIU 49 may be associated with elastic store circuitry or circuits to compensate for jitter and phase perturbations which may occur on the trunk inputs. These techniques are also known in the art.

As indicated above, the processor and interface 45 and 46 can be directly implemented by a microprocessor and function to control the switching operation by searching for service requests on the line inputs coupled to the LGMI 40, assigning connections in the connect memory 43 and exchanging of assignments with the remote terminal 21, while further serving to maintain current operation status on each system unit.

A service request from a subscriber line as a line coupled to the input of the LGMI 40 is in the form of an off-hook signalling condition, which is manifested by a bit in the control field of the transmit switch memory 41. This bit is designated as the on-hook/off-hook bit and is mapped into the processor memory along with a bit designated as the busy bit. A block search scan is executed on this portion of the processor memory block to find all off-hook subscribers who are not busy. When a subscriber service request has been recognized, the busy bit is set to inhibit further requests from this subscriber. A busy subscriber who remains on-hook for a period exceeding the holding time will have his connection cleared. Service requests can also be caused by sending a ringing tone from the host central office and these requests as for trunks are handled in a similar manner to off-hook service requests.

Hence, each time a service request scan is executed, the present subscriber activity is stored in the memory block of the processor system 46 and a list of subscribers requesting service is therefore formed. After the scan, no new subscribers can be added to the list because of another scan until all pending service requests have been honored. The processor 46 attempts to assign each subscriber in the list to an empty trunk span line time slot by entering that subscriber's address in the connect memory 43.

One can use traffic algorithms in order to share the traffic load evenly among the available span lines. As can be seen from FIG. 1, since each end of the span is attempting to assign available time slots, a conflict can arise. This conflict is resolved by making one end the master (RT 20) that assigns all time slots and requesting that the other end (CO 10), the slave, request assignments for its service requests from the master. A duplicate connect memory list is stored in the processor system 46 memory so that any errors can be detected.

When a time slot is assigned to a subscriber connection, both terminals (CO 10 and RT 20) must communicate to establish the connection. This communication path is accomplished through a span line time slot which exists between the two communicating TIUs. The switch organization provides a natural path from the processor to the TIU which can be used for the data channel. Hence, any trunk coupled to TIU 49 may be employed as a communication channel between switches.

As will be explained, because of the signalling insertion on the 6th frame, only seven of the eight bits are useful in providing a 56 k bit/sec. channel. Of course, a backup channel on a second span line is reserved for protection in the event of span line failures.

As shown in FIG. 1, the CO 10 and the RT 20 are coupled together via the trunks 30. One link is reserved for communications between the systems and is referred to above as a single span line time slot. This channel is the only control link between the terminals CO 10 and RT 20. Each system reads data from the receive switch memory 42 and writes data into the transmit switch memory 41 assigned to the data link. Hence, memories 41 and 42 each have a storage location assigned to the data link or a location indicative of the communication channel between CO 10 and RT 20. The switch memory is connected to a span time slot as described and data is transmitted between the terminal ends via the TIUs as 49.

To communicate via the trunks eight data link bits are transmitted 8000 times per second for a channel capacity of 64 k bits/sec. The least significant bit is used during one of six frames to send signalling, and hence, this bit is not used for data transmission. Therefore, in effect, seven bits or 56 k bits/sec. is the actual channel capacity for data link information transfer. The remaining seven bits are used to define character type, message data and character synchronization.

Each time a trunk or data link is idle and ready for data transfer, a null character is imposed on the trunk by the sending TIU. The null character is generated by a character generator or is stored at a memory location and transferred serially via the TIU to the idle trunk. The null character is defined as:

| $DL_7$ | $DL_6$ | $DL_5$ | $DL_4$ | $DL_3$ | $DL_2$ | $DL_1$ | $DL_0$* |
|---|---|---|---|---|---|---|---|
| 0 | 0 | 0 | 0 | 0 | 0 | 0 | 1* |

*$DL_0$ is not normally used, but is set to one on a null to avoid a long string of zeroes on the span line time slot. Signalling bits are also set to one for the same reason.

The control characters are used by the RT 20 and the CO 10 to initiate and terminate message sequence, perform data link tests, recover data link communications and to indicate failures.

The control characters are divided into two functional groups, one to initiate the actions indicated above, and the other to respond. For error detection at least two bits differ between any two characters of a functional group. The control character format is as follows:

| $DL_7$ | $DL_6$ | $DL_5$ | $DL_4$ | $DL_3$ | $DL_2$ | $DL_1$ | $DL_0$ |
|---|---|---|---|---|---|---|---|
| 0 | 0 | 0 | Control character Code ||||  not used |

Hence, as seen a control character is represented by bits $DL_1$ to $DL_4$ with bits $DL_5$ to $DL_7$ all zeroes and $DL_0$ not used. The control character differs from the null character accordingly and hence, bits $DL_1$ to $DL_4$ in a control character may not be all zeroes.

Data characters are used by either terminal to transmit data in the message mode. Messages are transmitted at a rate that can approach, but not equal, 8000 characters per second because of the asynchronous nature of the processor to data link interface (TIUs). The processor must delay more than 125 microseconds between characters to insure that each message character is sent at least once.

Some message characters may be sent twice, depending on the storage of data in the memory. Data characters are structured so that consecutive characters in a message are not identical, to thus make detection simple. This is done by having the most significant bit alternate on each message character. The data character format is as follows:

| $DL_7$ | $DL_6$ | $DL_5$ | $DL_4$ | $DL_3$ | $DL_2$ | $DL_1$ | $DL_0$ |
|---|---|---|---|---|---|---|---|
| 1 = even 0 = odd | 0 | 1 | DATA |||| Not used |

Hence, the $DL_7$ bit alternates for each message character, while the data is contained in bits $DL_1$ to $DL_4$ with $DL_5$ always at one and $DL_6$ at zero.

The message check sum is a special type of data character with a five bit data field used for error detection and sent in the following format:

| $DL_7$ | $DL_6$ | $DL_5$ | $DL_4$ $DL_3$ $DL_2$ $DL_1$ | $DL_0$ |
|---|---|---|---|---|
| 1 = even<br>0 = odd | 1 | | 5 bit check sum | v<br>not used |

This character is the last character of messages between terminals and differs from the above characters with $DL_6$ bit as a one and the $DL_7$ bit alternating according to whether the check sum is an odd or even character.

Referring to FIG. 1, it is seen that when neither the RT 20 or the CO 10 systems has a message to send, the data link (one of the trunks) is idle and the null character is easily detected by the TIU 49 or 49A or by a separate detection scheme. The idle link can then be seized by either system. Priority is normally granted to the RT 20 if both systems have a message at the same time. A special request character is available to insert a priority message at any time and such a priority will grant access to either system. To seize the idle data link or trunk, the requesting system processor must send a request to send characters to the other terminal and wait for acknowledgement that it is ready to receive a message in the high burst speed mode.

Messages are transmitted to the acknowledging terminal at the rate of one character every 200 microseconds and are in the general form as follows:

| MESSAGE CHARACTER | DEFINITION | TYPE | BINARY |
|---|---|---|---|
| SOM | Start of Message | Control | 00000010 |
| T | Message Type | Data (Even) | 101TTTT0 |
| N | Message Length | Data (Odd) | 001NNNN0 |
| X | Data | Data (Even) | 010XXXX0 |
| X | Data | Data (Odd) | 001XXXX0 |
| X | Data | Data (Even) | 101XXXX0 |
| X | Data | Data (Odd) | 001XXXX0 |
| CS | 5 bit check sum | Check sum (Even) | 11CCCCC0 |
| NULL | Null | Special Control | 00000001 |

After completion of transmission, the transmitting system waits for an acknowledgement reply that the message has been received and that the message will be executed. Time out and retransmit operations are available as needed to assure data link integrity.

The data link is maintained by the transfer of either data link messages or the data link check character. If no message is transferred during a 200 m sec. time out period, the data link is assumed to be lost and a recovery routine is initiated. Recovery will be attempted first at the "most likely" backup time slot as selected by an algorithm being executed at both terminals.

In this mode, the processor that experienced the data link time out sends a special control character on both the primary and assumed backup data links and waits for a reply from the other end in the form of a special control character that identifies the new data link. This recovery technique will continue up to two seconds, when a restart/recovery routine is initiated. Either system may initiate the restart mode by sending the special restart control character in time slot zero of all good spans as identified at each terminal. The receiving end responds to the restart character by entering the restart mode. When both terminals are in the restart mode, the remote terminal system processor selects a working time slot zero and sends a special identification character on this span and then normal data link communications can begin.

The restart/recovery mode is also used to first establish communications when a system is brought on line.

In regard to the above description, it should be apparent that based on the nature of the control character, it is simple to select a special control character to implement the recovery mode above described. It is the recovery mode and the restart mode which is unique and both the restart characters and the recovery characters are simply implemented.

The simple data format described above allows extremely simple detection of null characters, control characters and data characters due to the substantial differences between them. In this manner, control communications using a PCM data format of 8 bits can be employed over a voice communication channel and control communication based on the simple data format is asynchronous.

With the above description of the data link format in mind, reference is made to FIG. 4 which shows a data link character detector circuit 80. Essentially, as can be seen from the simple data format, data link character detection circuit 80 can be an 8 bit shift register with suitable decode gates for decoding each possible character indicative of a null or control character. The data characters will not be decoded due to their unique format and hence, will be directly transmitted to the time slot interchanger via the registers contained in the TIU 49.

The character detector is under control of the master clock control 48 as well as timing waveshapes produced by the time slot interchanger. Hence, the availability of trunks is detected by the data link character detector module 80 and such information is conveyed to the processor associated with the time slot interchanger.

Techniques for detecting the data link format as indicated above are well within the ken of those skilled in the art based on the simple nature of the format and the fact that each and every character as well as data may be uniquely determined.

It is of course understood, as indicated above, that a portion of the processor memory can be employed for data link character detection, as essentially, the memory locations comprise individual storage slots which store data. Since the memory contains the effective addresses of all trunks which are further tagged by the TIU 49, the data format is extremely easy to implement.

In a similar manner, a data link character detector circuit 82 is depicted in FIG. 4. Character generators are well known and the data link character transmitter is a character generator, which upon a proper command control from the TSI 90 in conjunction with a suitable synchronization clock, can generate any control character as above described. Such techniques for generating control characters in the above described format can also be incorporated by utilizing the processor and its associated memory and control circuits.

It is the simplicity of the data link format which enables easy detection and transmission of the plurality of control characters as well as data for transmission and reception on the communications link path or the trunk circuits 30.

Essentially, the data link character detector circuit as well as character generators operate relatively independent once data is being transmitted over the trunk. As above indicated, the characters indicate a typical message format which is transmitted at a rate close to 8000 characters per second. Since data characters are structured so that consecutive characters in the message are not the same, detection of data becomes extremely simple and since the most significant bit ($DL_7$) alternates on each message character, one cannot mistake data for any other character.

While it is true that the check sum character also provides an alternating most significant bit, this character always has the second most significant bit ($DL_6$) as a binary 1 and hence, this bit determines that the check sum character will never be mistaken for data.

As above indicated, it is well known in the telephone switching art on how to use characters to define the necessary functions and signalling over a trunk and essentially, the above noted table gives the important message characters for two-way communications as employed in a telephone switching system.

As one can ascertain, based on the data format given above, the flexibility and utility of the system is greatly enhanced over prior art systems and the simple message format provides self-synchronization, while actually requiring no additional hardware.

The system as shown in FIG. 1 allows the scanning of input lines as coupled to the LGMI 40 and 40R to be accomplished primarily by the scanning processor. Based on the use of the transmit and receive memories under control of the MAC 44, which also controls the connect memory, the processor employed can be any typical type of microprocessor presently available.

The switch memories, which include both the transmit and receive switch, are formulated in the processor address space and hence, both the transmit and receive switch memories are part of the controlling processor. In this manner, communications between two terminals is easily and expeditiously accommodated. Accordingly, in referring again to FIG. 1, let us give an example of how a typical connection would be made by the system described.

Assume line X, which is coupled to the LGMI 40 of the central office 10, desires to be connected to line Y, which is coupled to LGMI 40R associated with remote terminal 20. As indicated, when the line X signals for service, a bit is inserted into the time slot associated with line X. This bit is transmitted to the transmit switch memory 41 and a 1 is placed in the control field. This bit is also mapped into the processor memory 46 along with a busy bit. The scanning processor 46 recognizes the request for service when it appears in the transmit switch memory 41 and sets the busy bit to inhibit further requests from this subscriber. The processor 46 determines the line Y to which line X desires to be connected. In the case of a simple subscriber line concentrator mentioned before, this is accomplished by a simple mapping of line 1 to line 1R, line 2 to line 2R, etc. In a more general switching application the processor 46 informs the line X that it is ready to receive the desired number by inserting a digital tone signal as dial tone indicative of the service requested completed to line X during its time slot. The line X now transmits a number indicative of line Y. The processor 46 then determines if line Y is a local or remote line. In any event, for a connection from local line X to remote line Y, the CO 10 processor 46 communicates the request for connection to line Y to the RT 20 processor 46R using the data link as described above. The master RT 20 processor 46R then chooses an empty trunk span line slot. The available trunks are known and stored by the RT 20 processor 46R. Using the data link again, the RT 20 processor 46R communicates the trunk assignment for lines X and Y to the CO 10 processor 46 and each processor 46, 46R makes the necessary assignment, the CO 10 processor 46 by writing X into the connect memory 43 and the RT 20 processor 46R by writing Y into the connect memory 43R. In this manner, line Y will be connected to the same trunk as line X and hence, line Y will be connected to line X, with communication between transmit and receive paths.

The above switching, of course, takes place during the phase B time as described above, while the service request takes place during the phase A time.

Once the connection is made between line X and line Y, the lines are scanned at the 8000 sample per second rate and samples for line X and line Y are read into the transmit switch memory at 8000 samples per second according to the list stored in the connect memory. Thus, each transmission from line X is stored in memory and is sent as DOT from the transmit switch memory 41 to the TIU 49.

The data transmitted by line X automatically enters into the receive switch memory 42R where it is stored and then sent to line Y during the time slot associated with line Y corresponding to the data stored in the connect memory 43R. In a similar manner, transmissions from line Y are sent to the receive switch memory 42 which again is caused to send these transmissions via the DOR cable to the receive inputs of line X. Hence, each line receives transmissions from the other line at the 8000 sample per second rate.

When the connection is broken by line X or line Y going back on hook, the on-hook/off-hook bit is again set to zero indicating an idle line. The processor 46, 46R which detects the idle condition transmits this fact to the other process 46R, 46 using the data link and both X and Y are removed from connect memory 43, 43R. Simultaneously, the trunk which was involved in the connection between line X and line Y is also released. The RT 20 processor 46R stores the released trunk as available for future connection.

Of course, a connection can be made by the switch network, as the central office 10, between any subscriber connected to the LGMI 40 and any other subscriber connected to the same LGMI 40. Such subscribers have been designated as local subscribers as compared to remote subscribers who would be associated with the remote terminal 20. If a local subscriber desires a connection to another local subscriber, his service request is handled as above. In any event, upon dialing, the switching system conventionally and classically recognizes that the dialed information is indicative of a local call. The process of interpreting the dialing information emanating from a subscriber line circuit is well known in the telephone switching art and recognition as translation of dialing format is conventionally implemented by the processor system 46 in conjunction with the line circuit scan.

In the case of a local connection, the trunk interface unit 49 directs the data out from the transmit switch memory 41 directly to the receive switch memory 42 and this is done for both lines. In the event of a local call, a trunk is not required and hence, data is directly transmitted both in the receive and transmit states to an ordinary gate circuit or a suitable electronic switching arrangement as is well known in the art. However, communications between local subscribers takes place via the data stored in the memories 41 and 42 together with the sampling formats of the line circuits as above described.

As above indicated, it is the organization of the system above described which provides a natural data communications path between two interfacing processors according to this system. It is the inclusion of the transmit and receive switch memories which make the system operation extremely simple and reliable. The connect memory merely operates for call setup and takedown, while all data transmitted and received by each line is stored in the respective transmit and receive memories during phase A of the memory access sequence. During phase B, the data as stored in each memory location is transferred to or from a connected trunk and to the appropriate time slot. In this manner, the data transferred to the trunk comes from the location in the switch memory which is accessed by the contents of the connect memory location. This, of course, corresponds to the trunk time slot number which is supplied by the memory access control.

Since each TIU tags its own data, the need for input trunk and system frame synchronization is eliminated. The signalling between TIUs as 49 and 49R is extremely simple as explained and based on the data format, one can use a synchronous PCM time slot as an asynchronous control communications channel. As one can see, by using this data format in conjunction with the system depicted in FIG. 1, one achieves a natural and simple control communications path which requires no additional circuit elements.

It is understood that the exact and special operating details of this system should be completely apparent to one skilled in the art based upon the above system description. Hence, elaborate details concerning exact control circuitry, registers and other processing techniques described above have not been listed in detail, as based on system organization and explanation, one skilled in the art could easily implement the necessary hardware based on the above described system organization together with the particular and detailed analysis of the timing requirements as, for example, for the switching memories as well as for the memory access sequence. The programming of the microprocessor as well as its control is extremely simple and well within the skill of those familiar with the telephone art.

It is the unique organization of the system as well as the control of the switch memories and the data interchanged between terminals, which enables a communications channel with an extremely fast response capability as well as low processor computing overhead. The data format allows the use of asynchronous communications with a synchronous communications channel.

I claim:

1. A telephone switching network of the type adapted to provide connections between a plurality of input subscriber line terminals, comprising:
    a time slot interchanger means, including a first transmit switch memory (41) having a first plurality of storage locations each associated with a specific address indicative of a given subscriber terminal for storing at said location data to be transmitted by said line, a second receive switch memory (42) having a second plurality of storage locations each associated with a specific address indicative of a given subscriber terminal for storing at said location data to be received by said line,
    a connect memory (43) having a plurality of storage locations therein for storing data indicative of connections to be made between subscriber terminals, with each of said locations capable of being accessed by a given address for said location,
    subscriber terminal interface means (40) having input terminals coupled to said plurality of subscribers and output terminals coupled to said first and second memories (41 and 42) with certain of said output terminals as coupled to said first memory providing transmitted data, and other terminals coupled to said second memory for receiving data,
    processing means coupled to said subscriber terminal interface means, said first and second memories and said connect memory and adapted to direct all transmitted data emanating from said certain output terminals of said interface means to said first memory locations, and all received data emanating from said second storage locations to said other terminals, said processing means including access control means for controlling said connect memory to couple any of said first and second storage locations associated with any one subscriber terminal to any other of said first and second storage locations associated with another subscriber terminal via said interface means and according to an address stored in said connect memory, whereby any two subscriber terminals are capable of communicating with each other.

2. The telephone switching network according to claim 1 wherein
    said transmit switch memory, said receive switch memory and said connect memory are mapped into respective addressable locations of a single memory having accessible storage locations indicative of a first plurality of locations for storing said transmitted data for each of said subscriber terminals, and a second plurality of locations for storing said received data and a third plurality of locations for storing said connect data.

3. The telephone switching network according to claim 1 further including:
    a data link interface unit (49) having a first plurality of inputs coupled to said transmit switch memory and a first plurality of outputs coupled to said receive switch memory, said data link interface having a second plurality of outputs for coupling to a plurality of transmit data link paths, with said first plurality of inputs capable of being selectively coupled to said second plurality of outputs and said data link interface having a second plurality of inputs for selectively coupling to said first plurality of outputs with said inputs adapted to be coupled to a plurality of receive data link paths.

4. The telephone switching network according to claim 3 wherein
    said processing means is operative to connect any one of said transmit memory locations to any one of said transmit data link paths, and to connect any one of said receive memory locations to any one of said receive data link paths to enable said switching network to communicate with another network as arranged according to claim 1.

5. The telephone switching network according to claim 1 including scanning means coupled to said subscriber interface means for determining a request for service.

6. The telephone switching network according to claim 1 wherein
said transmit switch memory has an eight bit data field and a six bit control field.

7. The telephone switching network according to claim 1 wherein
said receive switch memory has an eight bit data field and a three bit control field.

8. The telephone switching network according to claim 1 wherein
transmit data emanating from a subscriber line is stored in said transmit memory at said location reserved for said line at a sample rate of 8000 samples per second.

9. The telephone switching network according to claim 1 wherein
receive data from said receive memory is applied to said subscriber line at a rate of 8000 samples per second.

10. The telephone switching network according to claim 1 further including
a master clock and control means for generating clock signals for said processing means and said subscriber interface means.

11. The telephone switching network according to claim 3 wherein
said access control means included in said processing means operates to provide a first memory access signal (phase A) wherein data is transferred to said subscriber terminals from said transmit and receive memories, and a second memory access signal (phase B) where data is transferred to and from said transmit and receive memories to said data link paths.

12. The telephone switching network according to claim 1 wherein
said subscriber terminal interface means includes means for multiplexing a first number of said subscriber lines on a first channel, with a second number on a second channel and so on.

13. The telephone switching network according to claim 1 wherein
said first and second channels are PCM channels and arranged in groups of twenty-four.

14. The telephone switching network according to claim 13 wherein
said PCM channels are in the 1.544 M bit format.

15. The telephone switching network according to claim 12 wherein
said subscriber terminal interface means includes means for converting serial data emanating at said input terminal from said channels to parallel data at said output terminals for applying the same to said transmit or receive memories.

16. The telephone switching network according to claim 1 wherein
said processing means further includes a processor memory capable of storing program instructions to be implemented for providing additional control of said switching network with at least a portion of said processor memory adapted to store all data stored in said connect memory.

17. The telephone switching network according to claim 1 wherein
said transmit switch memory and said receive switch memory are high speed random access read write memories.

18. The telephone switching network according to claim 1 wherein
said input subscriber terminals are telephone line circuits.

19. A telephone switching network system of the type adapted to provide connections between a plurality of local and remote subscriber terminals, comprising:
a first time slot interchanger means, including a transmit switch memory having a plurality of storage locations each associated with a specific address indicative of a given local subscriber terminal for storing at said locations data to be transmitted by said subscriber line, a second receive switch memory having a plurality of storage locations each associated with a specific address indicative of a given subscriber terminal for storing at said locations, data to be received by said lines,
a first connect memory having a plurality of storage locations therein for storing data indicative of connections to be made between subscriber terminals, with each of said locations capable of being accessed by a given address for said location,
first subscriber terminal interface means having input terminals coupled to said plurality of local subscriber terminals and output terminals coupled to said transmit and receive memories, with certain of said output terminals as coupled to said transmit memory providing transmitted data and other terminals coupled to said receive memory for receiving data.
first processing means coupled to said first subscriber terminal interface means, said transmit and receive memories and said connect memory and adapted to direct all transmitted data emanating from said certain output terminals of said interface means to said transmit storage locations, and all receive data emanating from said receive storage locations to said other terminals, said processing means including access control means for controlling said connect memory to access any of desired ones of said transmit and receive storage locations,
first accessible trunk interface means coupled to said transmit and receive memories and to said first processing means for receiving stored transmit data from said transmit means and for sending received data to said receive memory,
a communications link having one end coupled to said first interface means and having a data transmit path for sending data and data receive path for receiving data,
a remote accessible trunk interface means coupled to said communications link at said other end with a receive data path connected to said data transmit path of said first trunk interface and a transmit path connected to said data receive path of said first trunk interface means whereby communications via said communications link can occur between said trunk interface means, and
a remote switching network coupled to said remote accessible trunk interface means for connecting a second plurality of remote subscriber terminals associated with said remote system to said remote trunk interface means to enable communications between any one of said remote subscribers with one of said local subscribers.

20. The switching network system according to claim 19 wherein
said communications link is a synchronous PCM time slot trunk.

21. The switching network according to claim 19 wherein
said trunk interface units transmit eight bit data link characters at a rate of 8000 times per second.

22. The switching network according to claim 19 wherein
each of said trunk interface units includes means for detecting the idle condition of said communications link indicative of the transmission on said link of a null character manifesting seven consecutive binary zones followed by a binary one, with said null character repeating.

23. The switching network according to claim 22 wherein
each of said trunk interface means includes means for detecting a control character transmitted on said communication link and comprising three consecutive binary zeros followed by a four bit character control code, with an eighth least significant bit of no useable value.

24. The switching network according to claim 23 wherein
data information as transmitted comprises a first bit which alternates on each message character between a binary one or zero followed by a zero bit, followed by a binary one bit, followed by a four bit data code, with an eighth least significant bit of no useable value, wherein the effective data rate is 56K bits/sec.

* * * * *